Sept. 23, 1958        E. F. FABISH        2,852,962
METHOD OF MAKING A TWO-PIECE MILLING CUTTER
Filed Feb. 23, 1954
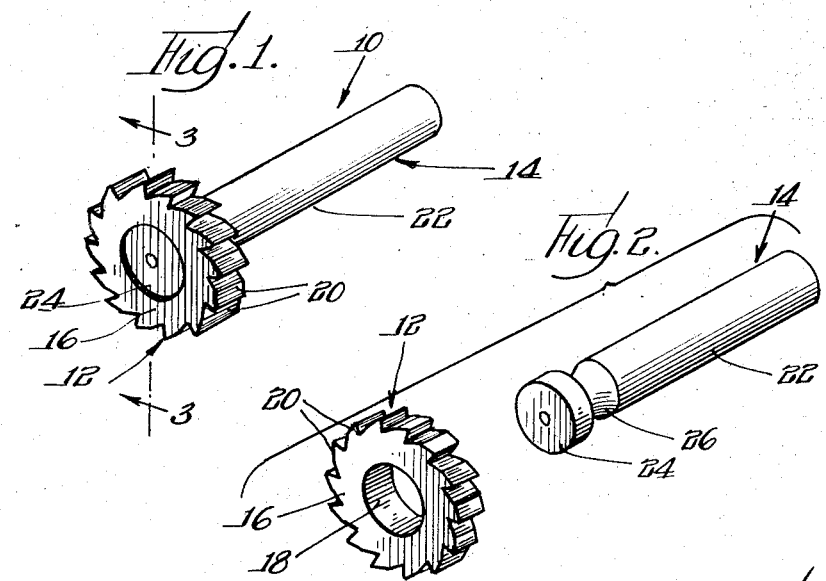
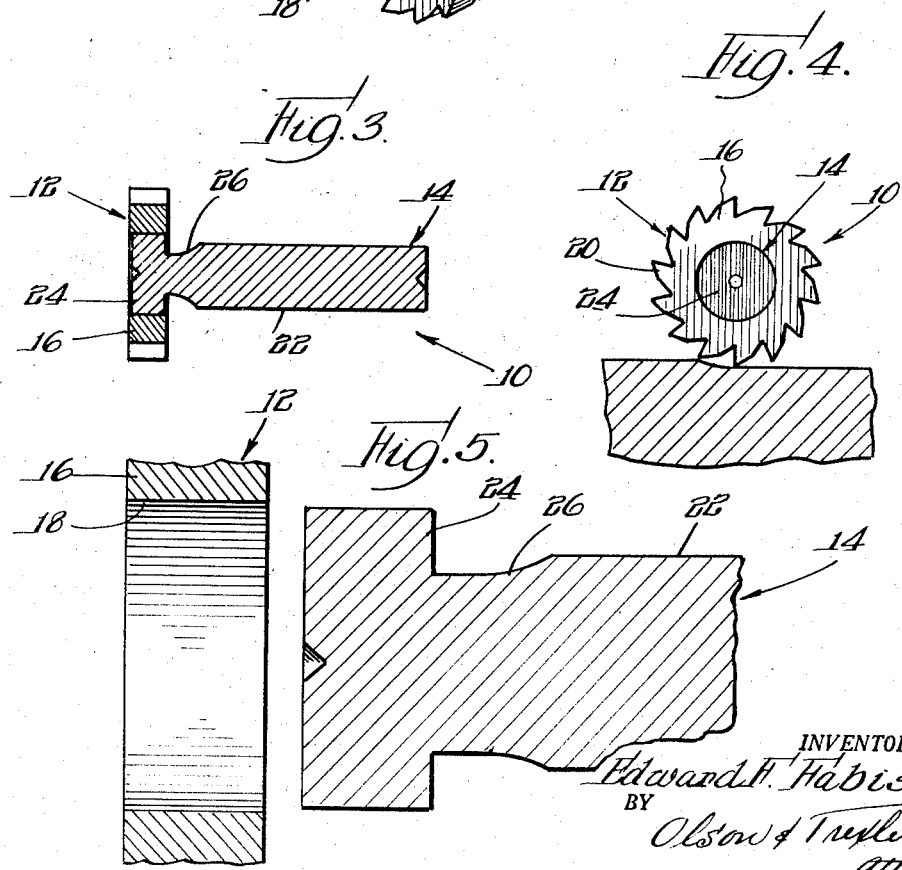
INVENTOR.
Edward F. Fabish
BY
Olson & Trexler
attys.

United States Patent Office
2,852,962
Patented Sept. 23, 1958

2,852,962
METHOD OF MAKING A TWO-PIECE MILLING CUTTER

Edward F. Fabish, Glenview, Ill., assignor to Illinois Tool Works, Chicago, Ill., a corporation of Illinois Application February 23, 1954, Serial No. 411,742

2 Claims. (Cl. 76—101)

The present invention relates to a novel milling cutter and method for making the same and more particularly to Woodruff key slot milling cutters of relatively small diameter.

Heretofore, relatively small key slot milling cutters have been constructed with integral cutter and shank portions. Larger sizes of over about 2 or 3 inches in diameter have usually been made in two pieces with the cutter portion keyed to a separate shaft. When the diameter of the cutter is reduced to a certain point it has been found that any attempt to provide the cutter body with a key slot will result in weakening the cutter body so that it is no longer sufficiently rugged to operate satisfactorily. Therefore, as pointed out above, the smaller sizes of cutters have usually been made integral with the shank. Such one-piece or integral construction of the cutter has several disadvantages. For example, the cutter teeth must be relatively hard and the shank should be relatively soft and tough for best performance. This result requires processing the one-piece cutter by relatively complicated and expensive heat treating methods. Furthermore, excess material costs arise in producing the one-piece cutters since there is a considerable amount of scrap and since the cutting teeth are desirably made from high speed tool steel. On the other hand, the shank may be made from relatively inexpensive carbon steel and this, of course, is impossible when the cutter is formed in one piece.

A primary object of the present invention is to provide a novel relatively small diameter milling cutter of the above described general type, which novel cutter may be more economically produced than generally similar cutters now in use and which novel cutter is relatively rugged.

A more specific object of the present invention is to provide a novel two-piece milling cutter of the relatively small diameter, which cutter includes a cutter portion and a shank portion connected together in a rugged and economical manner.

A further object of the present invention is to provide a novel method for making a milling cutter of the above described type in an economical manner.

Other objects and advantages of the present invention will become apparent from the following description and the accompanying drawing wherein:

Fig. 1 is a perspective view illustrating a cutter embodying the principles of this invention;

Fig. 2 is an exploded perspective view of the cutter and shank portions;

Fig. 3 is a cross sectional view taken along line 3—3 in Fig. 1;

Fig. 4 is an end view showing the cutter operating on the work piece; and

Fig. 5 is an enlarged cross sectional view illustrating the manner in which the shank and cutter portions may be assembled together.

Referring now more specifically to the drawings wherein like parts are designated by the same numerals throughout the various figures, a milling cutter 10 embodying the principles of this invention includes a cutter member 12 and a shank member 14. The cutter member 12 which may be made from high speed tool steel comprises an annular body section 16 having a central bore 18 and a plurality of peripherally spaced teeth 20 concentrically arranged with respect to the bore. The shank 14 which may be made from carbon steel bar stock includes a main portion 22 and an enlarged end portion 24 adapted to be assembled within the bore 18 in the manner described below. Preferably the shank is recessed as at 26 to provide additional clearance for chips and the like and a shank portion 22 is of course provided with a diameter sufficiently large to give this shank the desired rigidity.

In accordance with the present invention the cutter and shank members 12 and 14 are restrained against relative rotation after assembly thereof by means of a shrinkage fit. It has been found that this type of connection between the cutter and shank members is so effective that the teeth 20 may break under cutting pressures before any relative rotation will take place between the shank and cutter member. Furthermore, it is seen that with this type of connection all recesses such as key slots have been eliminated from the relatively narrow cutter member body section whereby the strength and ruggedness of the cutter member are retained at a maximum.

In accordance with the preferred method of assembling the cutter and shank members 12 and 14 the surface defining the bore 18 and the peripheral surface of the shank end 24 are provided with a finish of high quality since in general this will provide the shrinkage fit with more satisfactory resistance to relative turning of the two parts. In addition, these surfaces should be checked carefully as to concentricity and since this may be done relatively easily, concentricity of the cutter teeth with the axis of the shank may be relatively easily and economically obtained. For the relatively small cutter member and shank sizes contemplated by the present invention the shank end portion 24 is provided with a diameter of about .0015 inch to .0025 inch larger than the diameter of the bore 18 when both parts are at normal or room temperature. The shank is then cooled such as by immersing it in a liquid cooled by Dry Ice so that the end portion 24 contracts to a diameter less than the diameter of the bore 18 as shown in Fig. 5. When this occurs the end portion 24 is assembled within the bore 18 and the parts are held in assembled relationship while the shank is warmed and expanded. In accordance with the feature of this invention, the cutter member and shank member are rotated relative to each other before the shank has expanded fully or sufficiently to prevent such relative rotation. The shank and cutter members are usually relatively rotated something less than one complete revolution and preferably about one quarter of a revolution with the result being that the final shrinkage fit has a greater resistance to relative rotation between the shank and cutter. It is believed that this small relative rotation during assembly causes any minute projections or rough areas on either of the mating surfaces of the cutting and shank members to dig into the other surface and mechanically interlock the two surfaces. It should also be noted that the diameter of the shank end portion 24 is greater than the diameter of the remainder of the shank. This results in the provision of a relatively light weight shank while at the same time the enlarged end portion provides increased peripheral area for frictional contact with the cutter member thereby further strengthening the slippage fit.

From the above description it is seen that the present invention has provided a novel two-piece key slot milling cutter of relatively small size which may be manufactured with substantial savings in time and material as compared to similar one-piece cutters heretofore produced. In addition, it is seen the present invention has provided a novel two-piece cutter of relatively small size and a method for making the same, which cutter has improved ruggedness and operating characteristics.

While the preferred embodiments of the present invention have been shown and described herein it is obvious that many details may be changed without departing from the spirit and scope of the appended claims. For example, instead of cooling the shank as set forth hereinabove the cutter member might be heated in order to permit assembly of the cutter member and shank or the cutter member might be heated and the shank might also be cooled.

The invention is claimed as follows:

1. A method of making a relatively small key slot milling cutter from a narrow small diameter annular cutter member having an inner annular surface and a shank member including a portion having a peripheral surface with a diameter greater than the diameter of said inner surface of said cutter member at room temperature, said method comprising the steps of providing said inner surface and said peripheral surface with finishes of high quality, relatively expanding and contracting the cutter member and said shank member portion by changing the relative temperatures thereof until the diameter of said shank member portion is less than the diameter of said inner surface of the cutter member, subsequently assembling said shank member portion within said inner surface of the cutter member, and then relatively expanding and contracting said shank member portion and said cutter member by returning said members to substantially the same temperature and simultaneously relatively rotating said members a limited amount for connecting said members by a shrinkage fit.

2. A method, as defined in claim 1, wherein said members are relatively rotated less than one revolution.

References Cited in the file of this patent

UNITED STATES PATENTS

| Number | Name | Date |
|---|---|---|
| 20,282 | Mackerley | May 18, 1858 |
| 1,354,097 | Fitzsimmons | Sept. 28, 1920 |
| 1,411,335 | Foote | Apr. 4, 1912 |
| 1,733,594 | Greer | Oct. 29, 1929 |
| 1,938,995 | Beynon | Dec. 12, 1933 |
| 2,130,684 | Hintermeyer | Sept. 20, 1938 |
| 2,334,755 | Eglinton | Nov. 23, 1934 |
| 2,346,343 | Aber | Apr. 11, 1944 |
| 2,358,499 | Fiedler | Sept. 19, 1944 |
| 2,455,538 | Wagner | Dec. 7, 1948 |
| 2,464,297 | Ertt | Mar. 15, 1949 |
| 2,658,261 | Junker | Nov. 10, 1953 |
| 2,667,090 | Martin | Jan. 26, 1954 |

OTHER REFERENCES

Article, from "Machinery," January 8, 1948, pages 43–45.